July 10, 1956 — H. HÖLSCHER — 2,753,565
BRASSIERE
Filed May 13, 1954
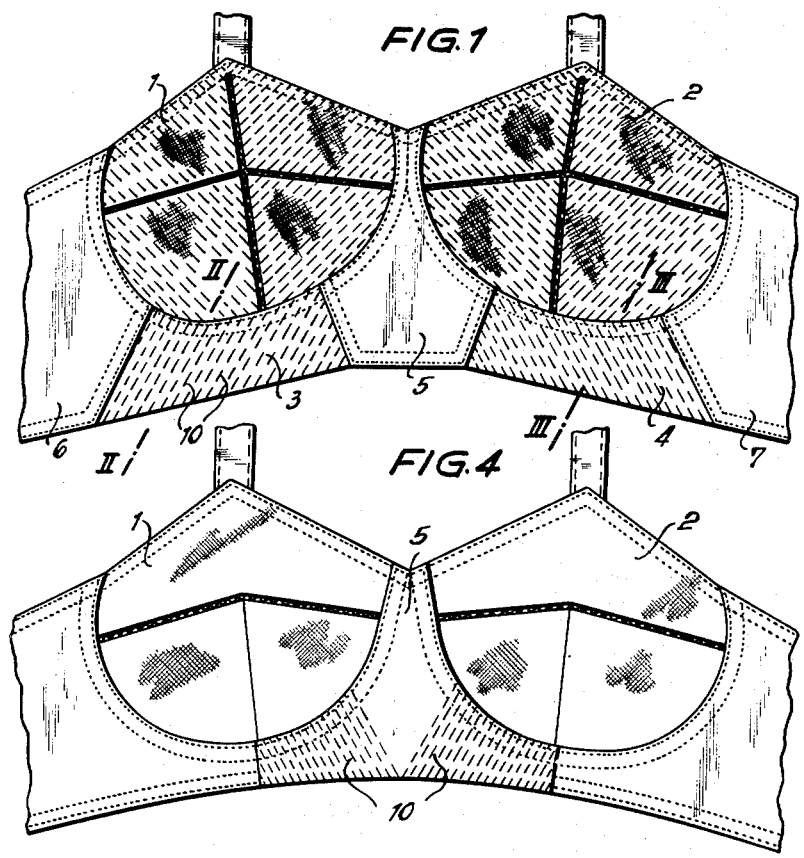
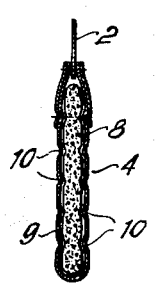
INVENTOR
Heinrich HÖLSCHER

United States Patent Office 2,753,565
Patented July 10, 1956

2,753,565

BRASSIERE

Heinrich Hölscher, Heubach, Wurttemberg, Germany, assignor to Triumph Bekleidungs- und Textilwerke Gesellschaft mit beschraenkter Haftung, Heubach, Wurttemberg, Germany Application May 13, 1954, Serial No. 429,588

2 Claims. (Cl. 2—42)

The invention relates to elastic inserts for brassieres.

The application of elastic inserts made, for instance, of rubber fabrics is known as such. However, the known rubber inserts have the great disadvantage of rolling-in at the edges; that is particularly apparent in those cases where the inserts are applied to the lower edges of the brassieres.

It is also customary to apply to the brassieres stiffening inserts of covered rubber to prevent the rolling-in of the inserts; however, the elasticity of these inserts is reduced accordingly.

In order to eliminate this severe drawback a brassiere was suggested which is provided with adjacently located elastic and stiffening inserts in order to obtain a flexibility in a horizontal plane which will also enable a satisfactory respiration.

Brassieres have also been constructed where the medium section consists of rubber fabrics which extend from the top of the brassiere to the lower portion thereof and are flexible in a cross direction. The elastic median portion permits an enlargement of the body of the bearer providing for proper breathing; uniform from above. However, the middle portion of the brassiere is lifted from the body and the shape creating difference of shape of the two breasts is thus eliminated.

An object of the invention is the application of elastic inserts to a brassiere acting as reinforcing means and as an air cushion. The inserts consist of at least one layer of not covered foam or crepe rubber which is encased by at least one layer of an elastic fabric.

In conformity with a preferred embodiment of the invention a material consisting of a foam rubber layer and encased by an elastic fabric layer is used for the production of the inserts to be applied to the brassiere.

The articles composed of the named and interposed layers are connected by vertical or inclined stitched seams and the soft inserts consisting of the uncovered foam rubber are compressed by the application of these connecting seams.

The great advantage of the invention consists therein that the inserts forming the subject matter of the invention are elastic and serve at the same time as reinforcing members preventing the rolling-in of the edges and the pushing together of the brassiere.

Moreover, the brassiere inserts produced in conformity with the invention have a practically unlimited durability. The edges of the applicant's brassiere inserts are as soft as velvet and therefore injury of the skin of the bearer is eliminated. The seams which secure the brassiere inserts are compressed during the application of the brassiere, do not touch the skin, do not produce friction or do not molest the wearer.

In conformity with the above the invention is characterized by a brassiere having two elastic inserts consisting of layers of not covered foam rubber and of elastic fabric layers encasing the foam rubber layer these inserts being located between the breast cups and the lower edge of the brassiere.

In the case of one embodiment of the invention the lower edge of the elastic fabric enclosing the foam inserts also forms a part of the lower edge of the brassiere. By the use of this brassiere the highly desired ductibility of the brassiere underneath the breasts is realized and at the same time the rolling-in of the lower edge of the brassiere is prevented. The rubber cushion formed in conformity with the invention fits similarly to an air-cushion smoothly to the body of the wearer. This differential action of the upper and lower portion of the brassiere is retained even if a large extension or stretching of its middle portion occurs.

By the shaping of the center portion of the brassiere in conformity with the invention the advantage is obtained that this center portion in the case of an expansion of the brassiere, for instance, by heavy breathing tightly fits the body. Another advantage results that a supporting ledge preventing the rolling-in of the bottom edge of the brassiere may be easily applied to the brassiere.

The invention will now be described in detail and with reference to the accompanying drawing.

In the drawings:

Figure 1 is a front elevational view of the brassiere;

Figure 2 is a sectional view on line 2—2 of Figure 1;

Figure 3 is a sectional view on line 3—3 of Figure 1;

Figure 4 is a front elevational view of a further embodiment of the invention; and Figure 5 is a sectional view of the center portion of the brassiere of Fig. 4.

As apparent from Figure 1 elastic inserts 3, 4 are provided which downwardly extend from the two breast cups 1, 2. These inserts are connected with the lower edges of the breast cups 1, 2 with the medium portion 5 of the brassiere and with its lateral portions 6, 7. The center portion 5 as well as the lateral sections 6, 7 of the brassiere are made of customary non-elastic fabrics.

The elastic inserts 3, 4 consist of an inner flat body or layer 8 of non-covered foam rubber; they are encased by an elastic rubber fabric 9 which surrounds the foam rubber layer 8. The inner foam rubber layer 8 and the encasing elastic rubber fabric layer 9 are with each other and with the brassiere connected by inclined stitched seams 10; the turned over edge of the rubber fabric 9 coincides with the lower edge of the brassiere.

In conformity with the embodiment shown in Figure 4 the two breast cups 1, 2 are connected by a middle portion 5 which is made of elastic rubber satin. The lower portion, see Figure 5, is inwardly and upwardly turned over. A foam rubber strip 8 is inserted into the overturned rubber satin pocket 9; the strip 8 is inserted into the overturned rubber satin pocket 9; the strip 8 and pocket 9 are connected by inclined stitched seams 10. The upper end portion 5 of the rubber atlas made pocket 9 extends upwards and underneath the breast cups, whereby an elastic breast cup supporting cushion results.

Since certain changes may be made in the above article and different embodiments of the invention could be made without departing from the scope thereof, it is intended that all matter contained in the above description or shown in the accompanying drawing shall be interpreted as illustrative and not in a limiting sense.

I claim:

1. A brassiere comprising a pair of breast supporting cups of substantially non-elastic material, side sections, each connected to a cup for releasable encirclement around the body of the wearer, and a middle section disposed between and connected to said cups forming an elastic interconnection between said cups and defining with its upper portion the top edge of the brassiere intermediate the cups and having a lower portion extending below said cups and interconnected to said side sections, said middle section being composed of elastic material, said lower portion being folded upon itself inwardly defining a pocket, a layer of foam rubber inserted in said pocket, and two series of parallel stitches formed throughout said lower portion, one series assigned to each breast cup, subdividing said pocket into elongated parallel sub-divisions, and dividing the foam rubber layer into parallel rows of integral elongated particles each disposed in a pocket sub-division.

2. A brassiere as claimed in claim 1, together with, the direction of stitching of each series forming an acute angle with the direction of stitching of the other series.

References Cited in the file of this patent

UNITED STATES PATENTS

| | | |
|---|---|---|
| 2,411,462 | Plehn | Nov. 19, 1946 |
| 2,419,514 | Wolf | Apr. 22, 1947 |
| 2,579,545 | Cadous | Dec. 25, 1951 |
| 2,585,137 | Kurland | Feb. 12, 1952 |